W. M. GREEN.
CAMERA.
APPLICATION FILED MAR. 23, 1916.
1,272,798.
Patented July 16, 1918.
4 SHEETS—SHEET 1.
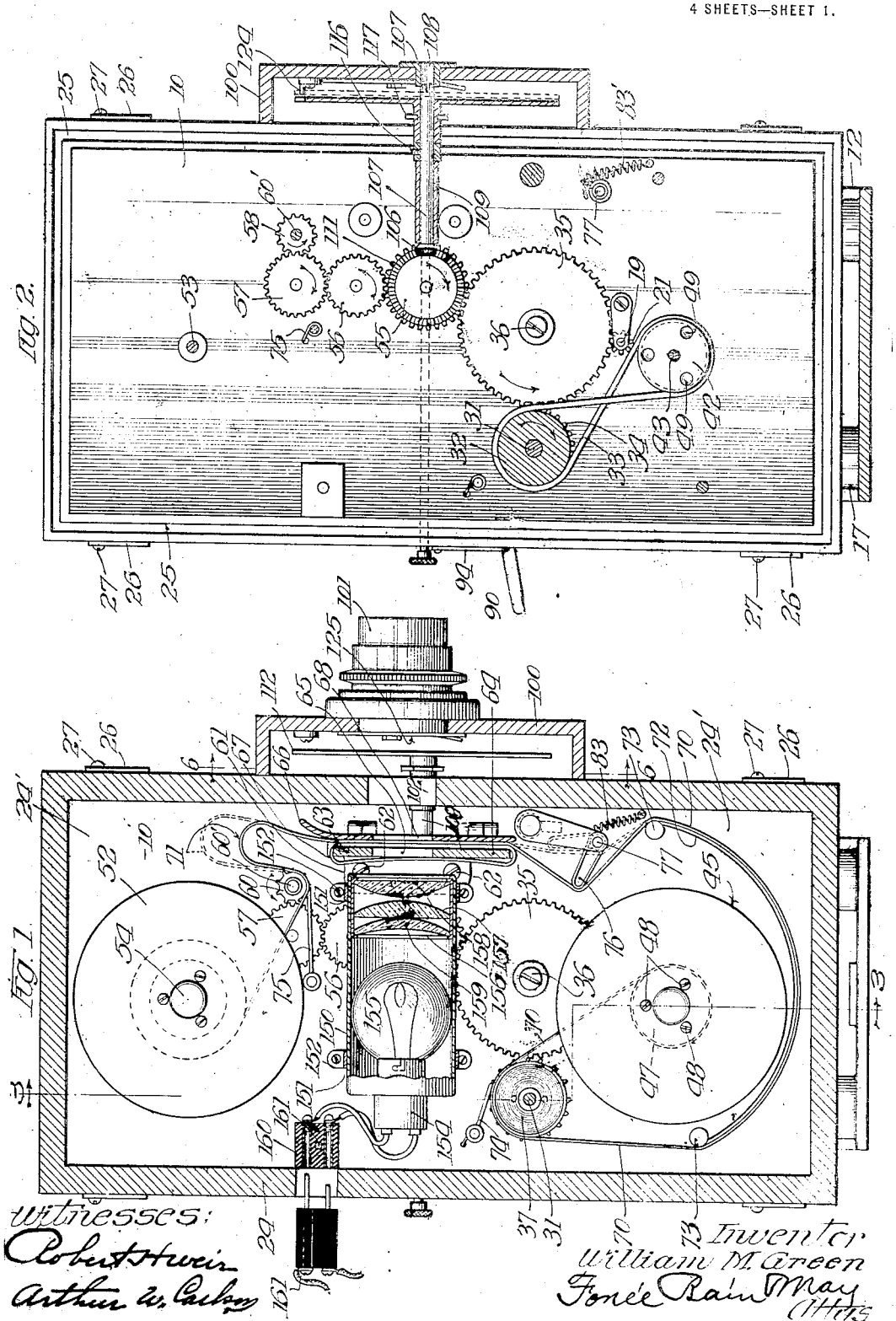

W. M. GREEN.
CAMERA.
APPLICATION FILED MAR. 23, 1916.
1,272,798.
Patented July 16, 1918.
4 SHEETS—SHEET 2.
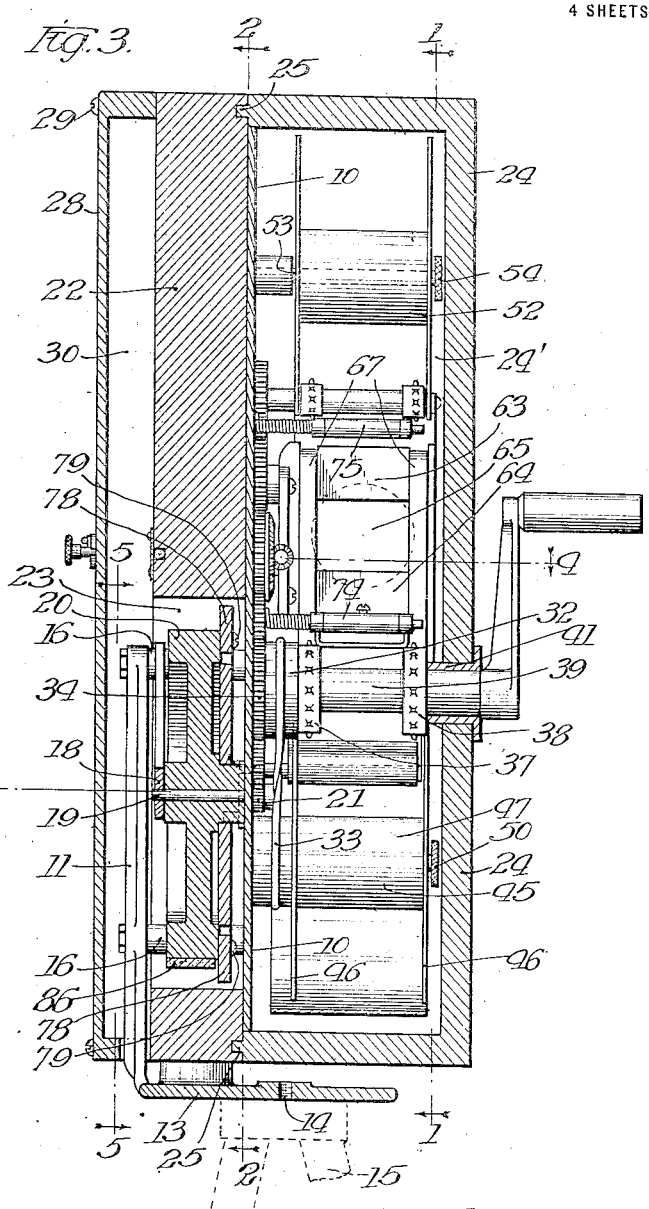
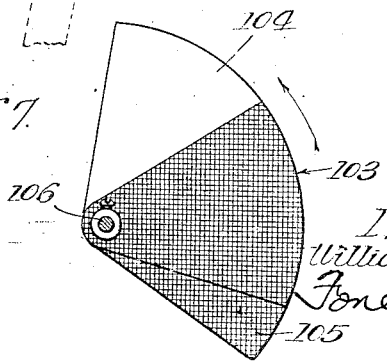
Witnesses:
Robert H. Weir
Arthur W. Carlson
Inventor
William M. Green
Jonee Plain May
Attys

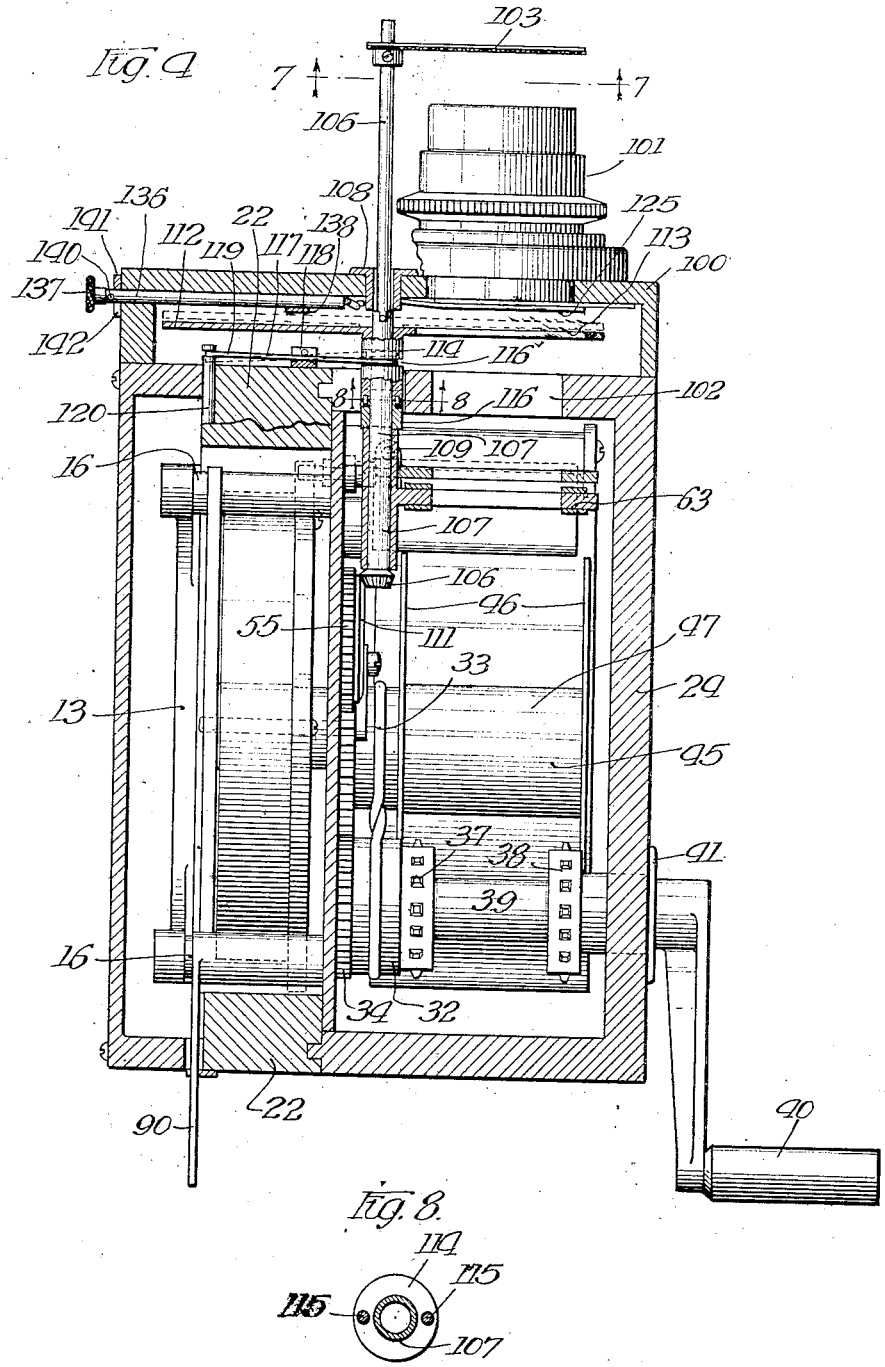

W. M. GREEN.
CAMERA.
APPLICATION FILED MAR. 23, 1916.

1,272,798.

Patented July 16, 1918.

Witnesses

Inventor
William M. Green

UNITED STATES PATENT OFFICE.

WILLIAM M. GREEN, OF EVANSTON, ILLINOIS.

CAMERA.

1,272,798.

Specification of Letters Patent.

Patented July 16, 1918.

Application filed March 23, 1916. Serial No. 86,071.

*To all whom it may concern:*

Be it known that I, WILLIAM M. GREEN, a citizen of the United States, residing at Evanston, in the county of Cook and State of Illinois, have invented certain new and useful Improvements in Cameras, of which the following is a specification.

My invention relates to improvements in cameras having especial reference to cameras of the movable film type.

One of the objects of my invention is to provide a camera having its parts so organized and arranged that it is capable of use for taking single or still pictures at variable time intervals upon a progressively movable film, by use of an instantaneously movable shutter, or by time exposure; of taking a series of moving pictures, on the same film, when rapidly, intermittently and uniformly moved and finally for projecting the still life and motion pictures upon a receiving surface, by a light not used when pictures are being taken and by means of the same mechanism incorporated within the camera, and without material change in the arrangement of the parts.

Another object of my invention is to provide means for instantaneously stopping the movement of the film and film-moving mechanism, by application of a brake to the film moving train to instantly overcome the momentum of the moving mechanism and film, thereby to save waste and to economize in the use of films.

Another object of my invention is to provide an improved means for intermittently moving the film, through the film chute, in such manner as to relieve the film of much of its undue strain, by decreasing the effect of inertia of the film at the beginning of each impulse by imparting an initially slow movement to the film and gradually increasing the speed rate at which it is moved, thereby consuming less time, in the aggregate, in moving the film from one picture to another so that a smaller time interval is required to move the film from one picture to another and allowing longer rests or dwells between the movements. This enables me to produce equal results with less film length and a smaller number of pictures than heretofore.

Other and further objects of my invention will become readily apparent, to persons skilled in the art, from a consideration of the following description taken in conjunction with the drawings, wherein:—

Figure 1 is a section, taken on line 1—1 of Fig. 3.

Fig. 2 is a section, taken on line 2—2 of Fig. 3.

Fig. 3 is a section taken on line 3—3 of Fig. 1.

Fig. 4 is an enlarged transverse section, taken on line 4—4 of Fig. 3.

Fig. 7 is a section, taken on line 7—7 of Fig. 4.

Fig. 8 is a section, taken on line 8—8 of Fig. 4.

In all the views the same reference characters are employed to indicate similar parts.

Figure 5:
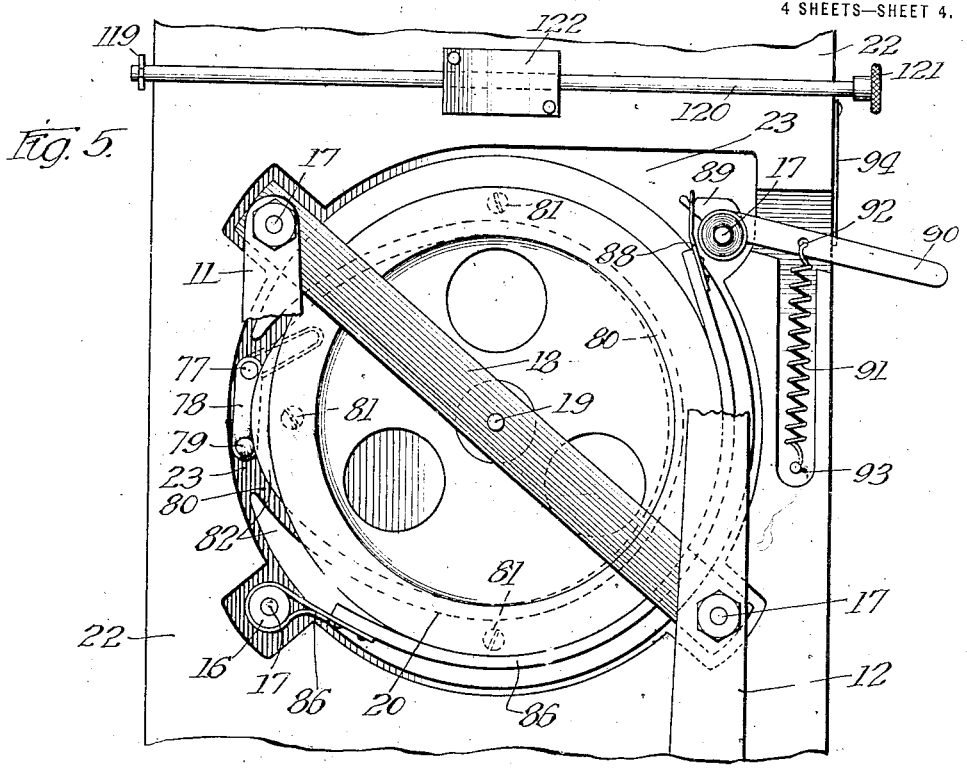
Fig. 5 is an enlarged section, taken on line 5—5 of Fig. 3.

The operating mechanism of my camera is mounted upon a metal frame consisting of a front frame plate 10, and vertical standards 11 and 12 which rise from a base 13 which supports the camera and which contains a screw threaded perforation 14, for insertion of a screw, to fix it to the supporting standard 15. The vertical frame members 11 and 12 are spaced apart from the plate 10 by means of spacing sleeves 16 that overlie studs 17 of which there are four of each. A cross bar 18 is secured to diagonally opposite studs for bearing support of the shaft 19 of the fly wheel 20. The shaft 19, of the fly wheel passes through the plate 10 and carries on its outer end a pinion 21. A relatively thick back plate 22, of wood, is cut away, as at 23, Fig. 5, to provide space within which to contain the fly wheel 20 and other operating mechanism. In front of the plate 22 is a removable wooden casing or closure 24, making tongue and groove engagement with the plate 22, as at 25, thereby to provide light-tight joints in this part of the camera. The closure 24 is held in place by means of clips or hooks 26, secured to the plate 22, as by screws 27. Of such fastening members there may be any desired number for the purpose of holding the parts together, and they may be of such form and configuration as are best adapted for the purpose.

Another closure 28, which may be of thinner material, and of wood, is secured to the back of the plate 22, as by screws 29, or the like, leaving a space 30 between the plates 22 and 28.

A main drive shaft 31 has bearing in the plate 10 and projects therebeyond and carries a sheave 32 for a crossed drive belt 33. The sheave 32 is also provided with a gear wheel 34 which meshes into a relatively larger, intermediate gear wheel 35, which is supported on the plate 10, on a bearing 36, and which meshes with the pinion 21 that drives the fly wheel 20.

The drive shaft 31 also carries film-propelling sprockets 37 and 38, spaced apart by a sleeve 39. A hand crank 40 is provided with a bearing 41 in the cover 24, and is screwed on to the end of the drive shaft 31 to make driving engagement therewith. The shaft 31 is turned clock-wise by the crank handle 40 and the cross belt 33 rotates a blank sheave 42 in anti-clockwise direction. The shaft 43, which carries the sheave 42, projects forwardly sufficiently to carry the film receiving reel 45. The sides 46, 46, of the film reel, are secured to a central drum 47, by three spaced apart screws 48. The heads of these screws are the means by which the reel is driven. The sheave 42 is provided with three spaced-apart coöperating depressions 49 to receive the heads of the screws 48, and into these depressions the screw heads pass when the film reel is held in position by means of a nut 50 that is screw threaded on the end of the shaft 43 that supports the reel. Another film reel 52, is supported on the shaft 53, at the upper end of the instrument, and is held in place by means of a similar threaded nut 54. A train of gear wheels, consisting of the intermeshing gear wheels 34, 35, 55, 56, 57 and 58 are supported upon bearings secured to the plate 10 and positively rotate the film moving sprocket 60 in proper relation to the sprocket 37.

The film chute consists of the bracket 61, secured to the plate 10, by screws 62, and projecting outwardly into the compartment 24', as at 63 and 64. The parts 63 and 64, are separated, as at 65 to provide a space through which the light passes through the film. A front or rest plate 66, of the film chute, provides a rest for the film, it being yieldingly held in contact with the inner surface of the plate, by means of two springs 67—67. The plate, or rest, 66 is also provided with a perforation 68 which registers with the perforation 65 between the plates 63 and 64. The springs 67—67 hold the film in contact with the plate 66, and presents it in a uniform flat plane to prevent wrinkling. They also produce a certain amount of friction to yieldingly retain the film in the chute.

The film 70 passes from the reel or spool 52, under the driving sprocket 60 which operates at a higher rate than sprocket 37, thus making a loop, as at 71, and then passes through the film chute in front of the plate 66 in contact with the springs 67—67 and from thence in front of the intermittently moving, or vibrating arm 76, under a film guard 72, which is held in place by studs 73, thus passing under the receiving reel or spool 45, and over the driving sprocket 37, and into engagement with the drum 47 of a spool or reel 45. It is wound upon the drum of the reel 45 by means of the cross belt 33. There is some frictional slippage, between the belt 33 and the driving sheave 42 to compensate for variation in diameter of the receiving reel or spool, as the film is being wound thereon. The film is held upon the driving sprockets 37 and 60 by means of spring pressed fingers 74 and 75, respectively.

The means for moving the film intermittently consists of the pivoted arm 76, secured to a shaft 77, that passes through the plate 10 into the space 23, at the back of the plate, and which carries on the rear end another arm 78 which in turn carries on its free end a cam roller 79.

Secured to the front surface of the fly wheel 20, as by screws 81, is a cam plate 82. The cam plate 82 is provided with an eccentric cam slot 80, into which the roller 79 passes as the fly wheel is rotated. The cam slot 80 is eccentric to the axis of the cam plate 82 and therefore the shaft 77 is given an oscillating or vibrating movement, by the roller 79 as it plays in the groove 80. The shaft 77 being thus vibrated the film moving arm 76 is vibrated to the extent shown in full dotted lines in Fig. 1. The spring 83 holds the roller 79 in the groove 80, at the point where the outer boundary of the groove is discontinued, as shown in Fig. 5. The arm 76 imparts a quick short movement to the film 70 through the chute 63 and moves back so that the slack thus produced may be wound upon the reel 45 while that portion in the chute remains stationary. The movement begins slowly and gradually accelerates to the end of the stroke. The shape of the cam characterizes the movement of the arm. The loop of film above the film chute and the loop below permits intermittent movement of the film.

A brake band 86, consisting preferably of leather, overlies about one-half the circumferential peripheral edge of the fly wheel 20, being secured at one end to a metallic clip 86, that is passed around the sleeve 16, over the stud 17, to hold this end fixed, the other end being secured to a clip 88 which is perforated for the short end 89 of the lever 90. The lever 90 has pivotal bearing on the stud 17, and the brake band 86 is yieldingly held in contact with the outer surface of the fly wheel 20, by means of a spring 91 which is secured to the lever 90, as at 92, and to a fixed stud 93. When the lever 90 is released, as shown in Fig. 5, the brake band 86 is automatically applied to the outer surface of the fly wheel by the spring 91, and the mechanism is instantly stopped. To operate the camera it is only necessary to lift the outer end 90 of the lever and hold it up in position with the brake band out of contact with the surface of the fly wheel, by means of the latch lever 94. When the machine is being operated, and it is desired to stop it instantly, it is only necessary to move the latch lever 94 out of the path of the lever 90 when the spring 91 will automatically apply the brake. The brake is very positive and instantaneous in its operation and being applied directly to the fly wheel the stress effect of momentum is not transmitted through the more delicate mechanism of the apparatus.

Fixed to the front of the casing is a shutter box 100. A tubular lens holder 101 is secured to the front wall of the shutter box, in front of an aperture 102 made through the casing 24.

A projecting shutter 103, is rotated in front of the tubular lens holder 101, and consists of an imperforate or opaque segment 104 on its leading edge, and a similar segment of foraminous or translucent material, such as wire cloth 105, on its trailing edge. The relative surface of the latter, to the former, to be exposed before the lens, may be varied by rotarily shifting the screen members 105. The combination or association of the opaque and semi-translucent wings or segments on the projecting shutter serves to temper the abrupt change from one picture on the screen to the next. By this combination one picture is made to substantially blend into the succeeding picture. This composite shutter 103, is rotated upon the shaft 106 in front of the lens contained in the holder 101, and is used only when the camera is employed to project pictures upon a screen. The shaft 106 and the shutter 103, may be removed from position when pictures are being taken by the camera, by disconnecting it from its bayonet joint connection with the tubular shaft 107 and removing it from the tubular bearing 108 in the shutter box 100. The shaft 107 finds bearing in a tube 109, which is a part of or fixed to the film chute 63. The shaft 107 carries on its inner end a beveled gear wheel 106 which meshes with the beveled gear teeth 111, carried by the wheel 55.

Figure 6:
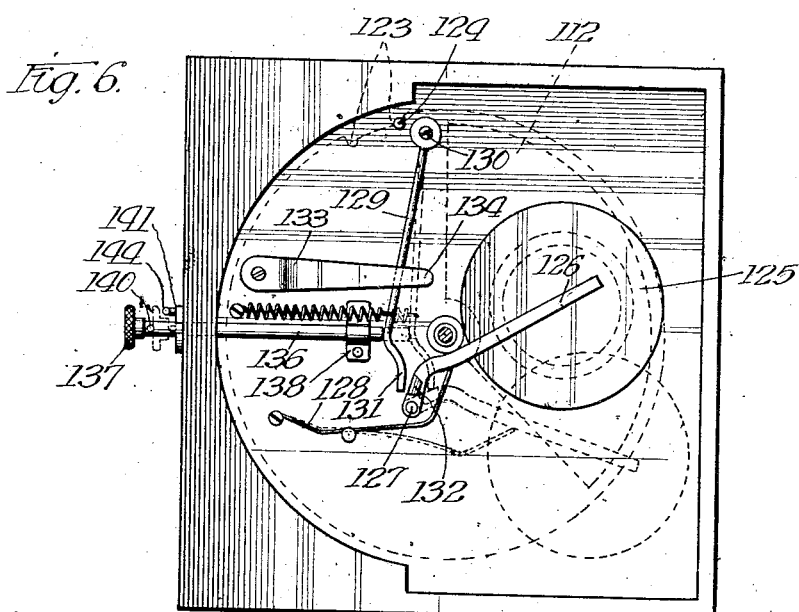
Fig. 6 is an enlarged section, taken on line 6—6 of Fig. 1.

Driven from the shaft 107 is a shutter disk 112, perforated as at 113, as shown in Fig. 4 and in dotted lines in Fig. 6. The disk carries a hub 114 which is slidable upon the hollow shaft 107, and which carries drive pins 115, (see Fig. 8) which engage registering perforations in the collar 116, that is fixed to the shaft 107. When the pins are in the perforations in the collar, the shutter disk 112 is driven by the shaft 107. Sleeve 114 is provided with an annular groove 116' in which engages a lever 117 having a bifurcated end, that is pivoted at 118, and that has an extended end 119. The end 119 of the lever is connected to a sliding push rod 120, which passes through the casing and is provided on its remote end with a thumb button 121. A friction plate 122 is secured to the back plate 22 and presents some frictional resistance to the axial movement of the rod 120, so as to maintain it in the position in which it has been placed. When the button 121 is in, toward the casing, and the rod 120 has thereby been axially moved, the clutch sleeve 114, of the disk shutter 112, is thrown into driving connection with the fixed collar 116 and the shutter 112 is thereby rotated, when the shaft 107 is rotated by the effect of the beveled gear 111 and the beveled pinion 106. The shutter disk 112 contains one or more notches 123 in its periphery, for engagement with a fixed pin 124. When the button 121 is pulled out, away from the casing 22, the rod 120 is axially moved and by cooperation of the lever 117 the disk 112 is disengaged from the driving collar 116, on the shaft 107, and is brought into contact with the fixed pin 124. When in this position the opening 113 in the disk 112 will register with the opening 102 in the casing 24.

In the shutter box is another shutter which may be used for instantaneous exposure, or for time exposure for taking still pictures or for taking a single picture, one at a time without the necessity of moving the film rapidly at uniform intervals, as in taking moving pictures. A disk 125, sufficiently large to close the opening in the lens holder 101, is secured to a lever 126, that is pivoted, as at 127. A spring 128 bears against the lever 126 and normally and yieldingly holds the disk 125 over said opening. A lever 129, is pivoted as at 130, its free end 131 adapted to engage a tapered lug 132 on the lever 126. When the lever 129 is moved into the dotted line position the disk 125 will thereby be moved away from the perforation which it normally covers, and if the lever 129 is moved slightly farther than shown in dotted line position in Fig. 6, the end 131, of the lever 129, will move out of the path of the lug 132 and the spring 128 will return the disk to its closed position, so that when the lever 129 is moved laterally the full extent, the disk 125 will momentarily open the perforation which it normally closes and immediately be returned to its closed position, by the spring 128. When the lever 129 is automatically returned, by the spring 133, it rides over the top of the tapered lug 132, against the resilient opposition of the spring blade 134, which latter spring returns it to its normal plane, ready for another excursion for moving the shutter 125 in a similar manner. A stem 136, terminating in a knob 137 is adapted to be moved axially for the purpose of displacing the lever 129 for moving the shutter 125. The stem 136 has a bearing 138 for directing the end of the stem against the lever 129.

Projecting laterally from the stem 136, near the knob 137, is a pin 140. A collar 141 surrounds the stem 136 and is provided with a slot 142, through which the laterally projecting pin 140 may pass when the pin is in the same radial plane as the slot. When the pin is in this plane, and the knob 137 is pushed inwardly, the lever 129 will be moved to its full extent so that it will slip past the lug 132 and allow the shutter 125 to return automatically to a position to cover the orifice that registers with the lenses. If the stem 136 now be rotated so that it will touch the top surface of the collar 141, and not pass into the slot, then the stem, when pressed inwardly, will move the lever 129 only to the dotted line position shown in Fig. 6, the pin 140 resting upon the upper surface of the collar 141. The shutter 125 will therefore be held open, or removed from the lens orifices only so long as pressure is applied and maintained on the button 137 and the stem 136 is depressed inwardly. After pressure has been released, the spring 133 will return the stem 136 to its normal position and the shutter 125 will be returned to its place by means of the spring 128. Now when it is desired to hold the shutter 125 in open position for an indefinite period of time, pressure is applied to the button 137 and the stem 136 is axially moved into the dotted line position, when the stem 136 is then rotated so that the pin 140 will come under another laterally projecting pin or latch 144. This pin 144 will then latch and hold the parts in the positions in which they have been placed for an indefinite time, or until the stem 136 is again rotated so that the pin 140 will be moved out from under the latch stem 144. By means of the button 137 the camera may be made use of to take time pictures or single snap shot pictures, when the film is relatively stationary. The snap shot pictures being taken when the pin 140, in the stem 136, registers with the slot 142 so that the stem 136 will move its full extent, to cause the lever 129 to slip off the lug 132, and thereby permit the shutter 125 to be automatically returned to its position. If time pictures are desired to be taken, it is only necessary to rotate the stem 136, until the laterally projecting pin 140, makes contact with the upper surface of the collar 141 when the shutter 125 may be held open, by pressure upon the button 137; for as long a time as may be desired.

The light for projecting the pictures from the film is contained in a tubular casing 150, secured to the back plate 10, by means of straps 151 and screws 152. The rear end of the casing 150 is provided with a lamp socket 154, for a lamp 155. In the front end of the casing 150 is a tubular lens holder 156 containing two plano-convexo lenses 157 and 158 and a concavo-convex lens 159, constituting a condenser which projects light rays from the lamp 155 in parallel planes through the perforation 65 in the film chute, the perforation 102 in the casing, and through the lens holder 101. A plug receptacle 160 is connected to the plate 10, as by a screw 161 to receive a connecting plug for insertion in the receptacle 160. The plug 161, communicating with a source of electric current, may be inserted in the receptacle 160 through the opening in the casing, and at this time the lamp 155 is used for projecting the pictures upon a remote receiving surface.

Having described my invention, what I claim is:

1. The combination with a motion picture camera having a lens support, a film support at the rear of said lens support, means for moving a film across said support, comprising a drive shaft and a taking shutter driven by said drive shaft, of a projecting shutter in front of said lens support, and means for driving said projecting shutter comprising a detachable connection with said drive shaft.

2. The combination with a motion picture camera having a lens support, a film support at the rear of said lens support, means for moving a film across said lens support, and a taking shutter at the rear of said lens support, of a projecting shutter at the front of said lens support, common driving means for said shutters, and means for rendering either of said shutters inoperative.

3. The combination with a motion picture camera having a lens support, a film support at the rear of said lens support, means for moving a film across said lens support, and a taking shutter at the rear of said lens support, of a projecting shutter at the front of said lens support.

In testimony whereof I hereunto set my hand in the presence of two subscribing witnesses.

WILLIAM M. GREEN.

In the presence of—
 FORÉE BAIN,
 MARY F. ALLEN.